3 Sheets—Sheet 1.

B. R. GREEN.

BOOK STACK FOR LIBRARIES.

No. 11,401.

Reissued Jan. 30, 1894.

Witnesses:
George Barry,
P. B. Lawrence

Inventor:
Bernard R. Green
by attorneys
Brown & Seward

B. R. GREEN.

BOOK STACK FOR LIBRARIES.

No. 11,401. Reissued Jan. 30, 1894.

Witnesses:-
George Barry,
P. B. Lurand

Inventor-
Bernard R. Green
by attorneys
Brown & Seward

THE ECKERT LITHOGRAPHING CO., WASHINGTON, D. C.

B. R. GREEN.

BOOK STACK FOR LIBRARIES.

No. 11,401. Reissued Jan. 30, 1894.

Witnesses:-
George Barry
R. B. Lund

Inventor:-
Bernard R. Green
by attorneys
Brown & Seward

THE ECKER'S LITHOGRAPHING CO., WASHINGTON, D. C.

UNITED STATES PATENT OFFICE.

BERNARD R. GREEN, OF WASHINGTON, DISTRICT OF COLUMBIA.

BOOK-STACK FOR LIBRARIES.

SPECIFICATION forming part of Reissued Letters Patent No. 11,401, dated January 30, 1894.

Original No. 466,033, dated December 29, 1891. Application for reissue filed December 19, 1893. Serial No. 494,133.

*To all whom it may concern:*

Be it known that I, BERNARD R. GREEN, of Washington, in the District of Columbia, have invented a new and useful Improvement in Book-Stacks for Libraries, of which the following is a specification.

My invention relates to an improvement in book-stacks for libraries, in which provision is made for superposing a plurality of shelf-ranges one upon another, with floors at each range for gaining ready access to the shelves, and with free circulation of air from the main floor to the top of the stack, the structure being fire-proof, shelves interchangeable throughout the stack, and the material in the posts and girders disposed with respect to the strain so as to combine maximum strength with minimum weight.

A practical embodiment of my invention is represented in the accompanying drawings, in which—

Figure 1:
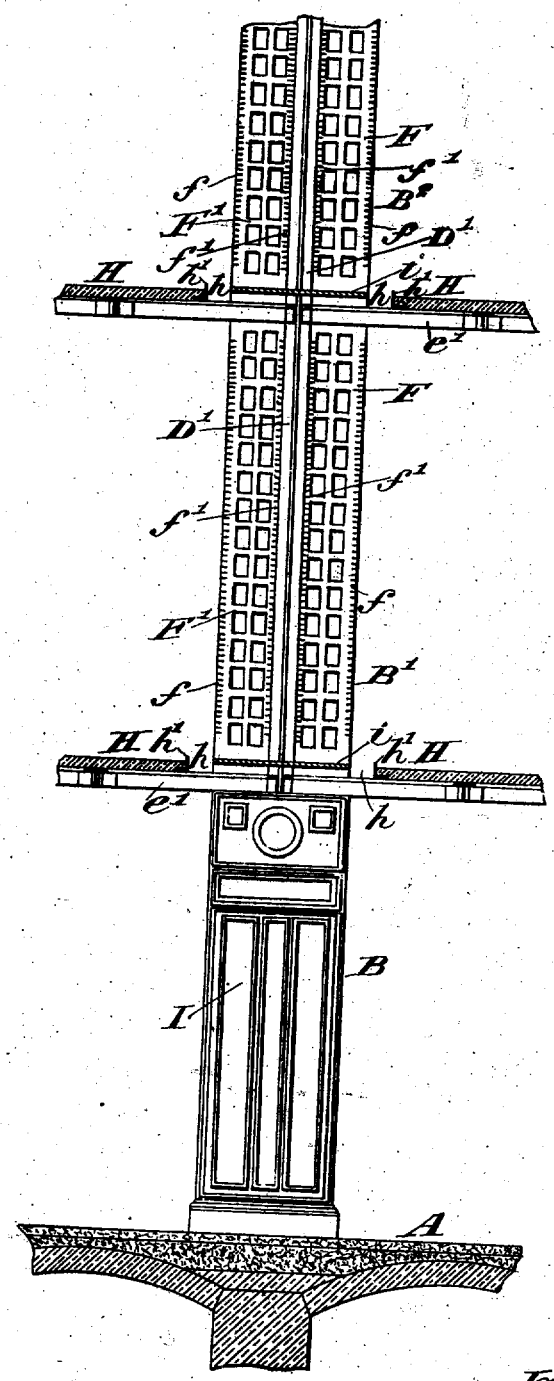
Figure 2:
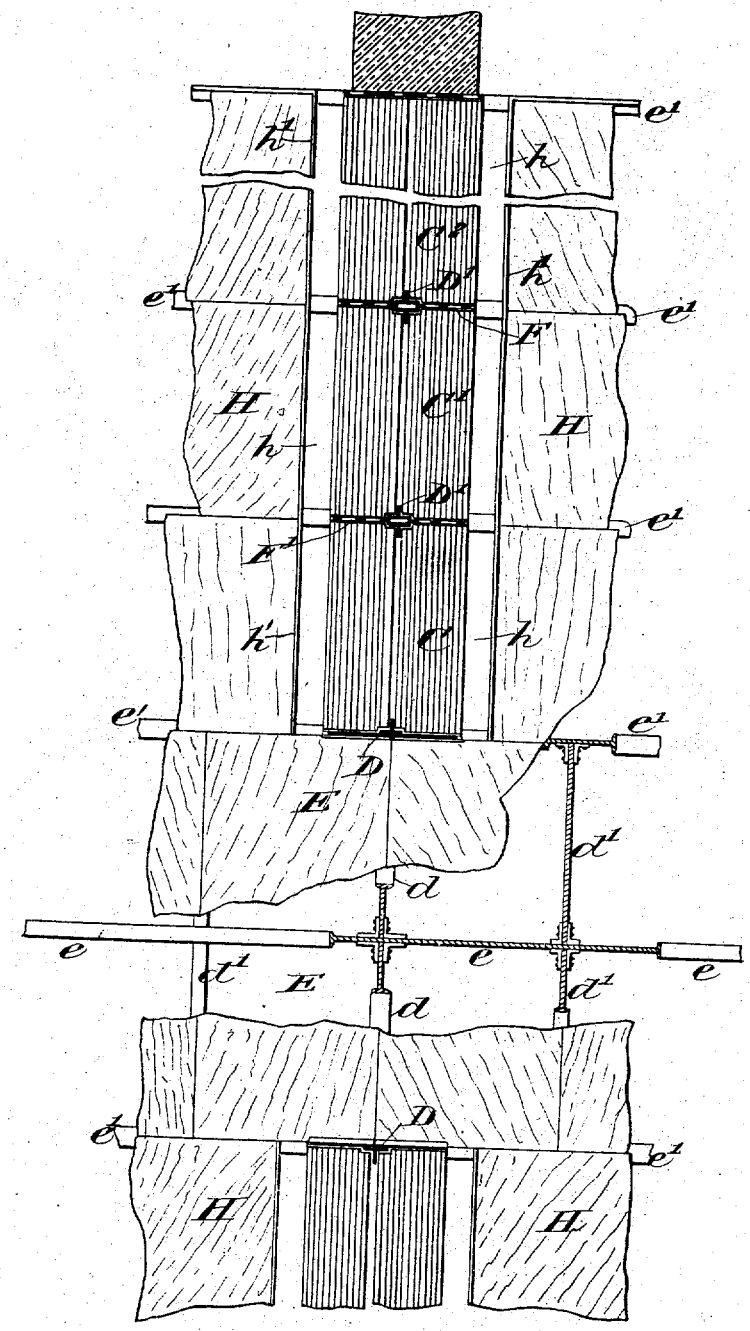
Figure 3:
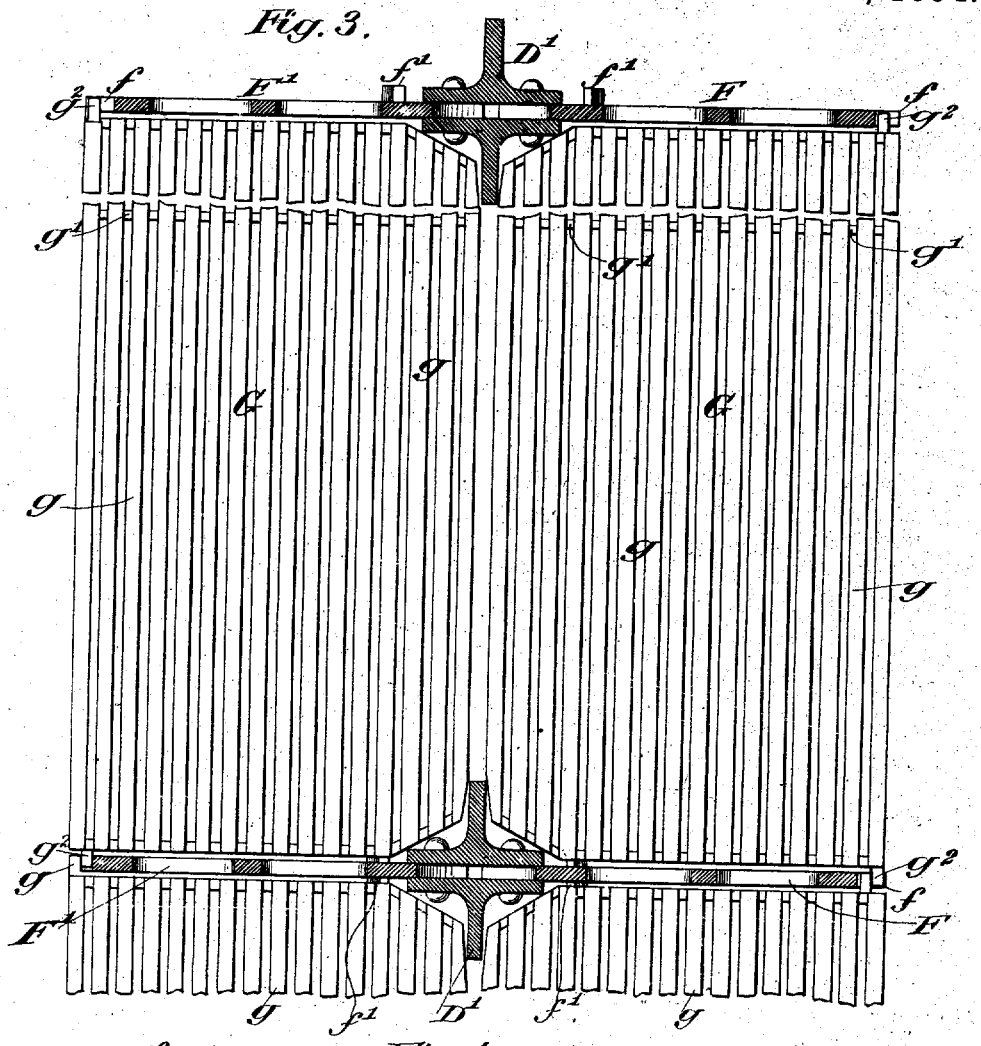
Figure 4:
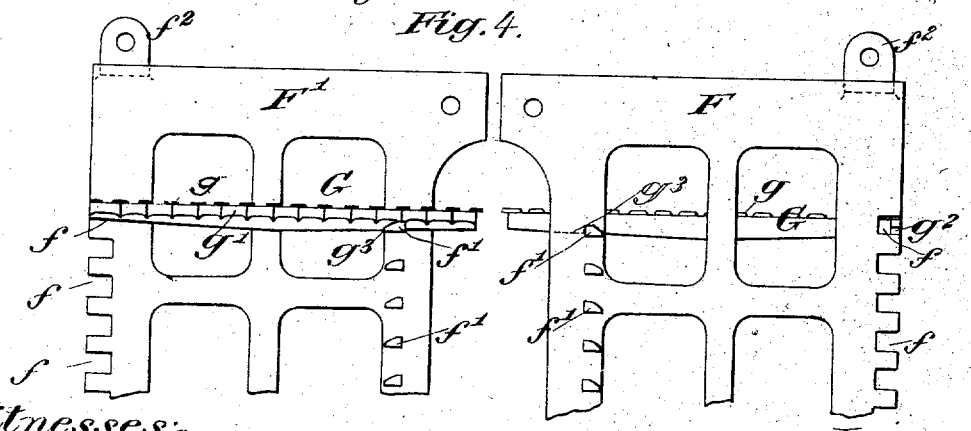

Figure 1 is a view of one of the divisions of a stack in end elevation, partly in section, representing two full superposed shelf-ranges and a portion of a third, the lower shelf range being shown with the ornamented end piece in position. Fig. 2 is a top plan view of one of the floors at the juncture of two shelf-ranges, representing one division of the stack complete and a portion of the end of the other corresponding division, the floor of the main avenue being partially broken away to show the arrangement and construction of the supports. Fig. 3 is an enlarged, top plan view of a shelf-section, the posts and end supports being shown in horizontal section, and Fig. 4 is an enlarged partial end view of the partitions between two shelf-sections, the one on the right being at the end of the shelf-section toward the observer and the one on the left at the end of the section away from the observer, the shelves being shown respectively in end elevation and in transverse vertical section.

A represents the main floor of a building upon which the stack is erected.

The stack, which in general practice will be one of a series of stacks, comprises two general divisions extending from the opposite sides of a main central avenue to the opposite sides or walls of a compartment of the building; or the divisions might terminate at their opposite ends at any suitable and desirable point intermediate of the opposite sides of the building or of a compartment of the building. As the two general divisions of the stack are similar in structure and arranged symmetrical with respect to the axis of the main avenue, it will only be necessary to describe in detail the structure and arrangement of one division.

Each general division of the stack comprises a plurality of superposed shelf-ranges, and each shelf-range comprises one or more shelf-sections, depending upon the length of range desired. The superposed ranges are represented by B, B′, B² (see Fig. 1) and the shelf-sections are represented by C, C′, C². (See Fig. 2.) The number of superposed ranges B, B′, &c., and height of each range may be increased or diminished at pleasure. I have found it feasible, in connection with large libraries, to superpose nine ranges, each seven feet high, one upon another. The supports for the ranges consist of vertical posts D, D′, placed at the ends of the shelf-sections and extending from the main floor to the uppermost range. The posts are made of strong metal, those at the ends (represented by D) being T-shaped in cross section, and the intermediate ones (represented by D′) being +-shaped in cross section. Girders *d* extend from the center of the main avenue E in the horizontal plane between two superposed ranges, in opposite directions, connecting the several posts D, D′ in the lines of the longitudinal axes of the shelf-ranges. A main girder *e* extends longitudinally along the center of the main avenue E, and to its opposite sides the girders *d* are secured. Girders *e′* located parallel with the girder *e*, are connected with the opposite sides of the posts D, D′ and extend from stack to stack. Girders *d′* also extend parallel with the girders *d* from the girder *e* to the girders *e′* at points central between two adjacent stacks. The girders *d*, located in the vertical plane of the center of the stress from the weighted shelves, are made heavier than the intermediate girders *d′*.

The end supports for the shelves are represented by F, F′, (see Fig. 4,) and consists of skeleton metal plates having their outer edges provided with series of notches *f* and the opposite faces of their inner edges with lugs *f′*.

The said supports are connected to and carried by the columns D′, and are provided with lips $f^2$ for securing them to the girders, and when placed in position serve to support two vertical series of shelves facing in opposite directions and having their rear edges in proximity to each other.

The shelves G are made of uniform size and structure, so as to be interchangeable throughout the stack. They are of the grid-iron style and may be cast of iron or steel in one piece and have their upper faces finished smoothly and treated to prevent rusting. The bars $g$ of the shelf are preferably of T-shape in cross section, and may be bridged at suitable intervals intermediate of the ends, as shown, for example, at $g'$, to give them the necessary stiffness. It is obvious that other material than iron or steel might be employed in constructing the shelves, and that the bars might be made separately and united by cross girders. The structure of iron or steel, cast in one piece and subsequently treated, is, however, the form which I at present prefer. The ends of the shelves are each provided with a lug and recess $g^2$, $g^3$, the former to engage one of the notches $f$ in the outer edge of the end support F or F′ and the latter to engage one of the lugs $f'$, which, with the recess $g^3$, is so shaped as to prevent the shelf from slipping forward unless raised to be disengaged. The lug $g^2$ at one end of the shelf is located its own width farther back from the edge of the shelf than the corresponding lug at the opposite end of the shelf, so that when the adjacent ends of two shelves, one in each shelf-section of the range, are adjusted in engagement with their common support F or F′, the lugs $g^2$ will occupy positions one to the rear of the other in one of the notches $f$, as shown in Fig. 3. Notches $f$ are also high enough to permit the lug on one shelf to be lifted over that of the adjacent shelf without disturbing the latter.

The floors H of the passageways, which extend at right angles to the main avenue between the two adjacent general divisions of the stack, are spaced from the front of the range, leaving openings $h$ from bottom to top of the stack for the free circulation of air, and also for convenience of communication with persons above or below and for passing small articles through.

The openings $h$ are to be distinguished from wide spaces which have heretofore been provided between a central gallery or walk and cases located upon opposite sides of the walk, for the puspose of supplying light from above; and in which a guard rail is provided to prevent a person walking along the gallery or walk from falling through.

The openings $h$ are narrow, so narrow as to form no dangerous pitfall for persons, but sufficient to provide for passage of sound to communicate with persons above or below and for the circulation of air and the transmission of small articles as above stated. The floors H are provided at their edges adjacent to the narrow openings $h$ with upwardly extending water tight guards $h'$ which extend to a height sufficient to prevent scrub-water, dust or other foreign matter on the floor from escaping over the edge and falling onto the books or floor or persons below, and to protect book bindings from injury from trucks, furniture, sweepers, &c., along the deck. The guards $h'$ are shown as formed of thin angle iron, having one flange fixed in the edge of the floor.

A diaphragm $i$ is placed at the deck-level in each section of the range to prevent fire running up or dust dropping, to add to the lateral stiffness of the structure, and to serve as a stepping-plate for passing through the range; and the openings $h$ above referred to are formed between the edges of the diaphragm and the edges of the floors H.

The ends of the ranges upon opposite sides of the main avenue may be provided with ornamental finishing slabs—such for example as that shown at I, Fig. 1. The skeleton structure of the stack and the provision for the circulation of air around and through it serve to distribute heat evenly throughout the several ranges, prevent any liability of molding or accumulation of dust, and furnish poor lodgement for book pests. The shelves may be removed and adjusted with facility at such distances apart as may be found advantageous, while the books resting thereon are at all times within easy reach of an attendant on the floor H.

The range sections, taken in connection with the removable shelves, admit of making a passage through a range whenever desired, or a space which may be used for a closet, case of drawers, writing table, &c. The structure also admits of lighting the corridors thoroughly from windows (not shown) placed at the opposite ends of the passages H.

What I claim is—

1. The book-stack, comprising two general divisions arranged upon opposite sides of a main avenue and extending in opposite directions therefrom, each division being composed of a plurality of superposed shelf ranges, the shelves of which extend outwardly in opposite directions from a central plane and platforms at the sides of the stack at the points intermediate between two ranges and spaced from the ranges, substantially as set forth.

2. The book stack, comprising a plurality of superposed shelf ranges, diaphragms at points intermediate of the successive superposed ranges and platforms at the sides of and at points intermediate between the successive shelf ranges the platforms being spaced a short distance from the shelf ranges, forming narrow openings between the platforms and the diaphragms for the purpose substantially as set forth.

3. The book stack, comprising a plurality of superposed shelf ranges and a platform at the side of and at a point intermediate of two shelf ranges, the said platform being spaced from the shelf ranges and provided at its edge with a water and dust proof guard extending upwardly from its edge, substantially as set forth.

4. The book stack, comprising a plurality of superposed shelf-ranges, each consisting of one or more shelf-sections provided with removable shelves, platforms at the points intermediate between two successive shelf-ranges spaced from the ranges, and diaphragms in the planes of the platforms and forming partitions between a shelf section of one range and a shelf section of a range next above it, substantially as set forth.

5. The book stack, comprising a plurality of shelf ranges, the shelves of each range extending from the vertical central plane of the range outwardly in opposite directions, supporting posts and girders, end pieces fitted to the posts and girders and provided with shelf-supporting notches and lugs and shelves adapted to removably interlock with the end pieces, substantially as set forth.

BERNARD R. GREEN.

Witnesses:

ED SUTHERLAND,

J. V. WURDEMANN.